United States Patent
Hinman (10) Patent No.: US 11,567,686 B2
(45) Date of Patent: Jan. 31, 2023

(54) SNAPSHOT LIFECYCLE MANAGEMENT SYSTEMS AND METHODS

(71) Applicant: Elasticsearch B.V., Mountain View, CA (US)

(72) Inventor: Matthew Lee Hinman, Aurora, CO (US)

(73) Assignee: Elasticsearch B.V., Amsterdam (NL)

( * ) Notice: Subject to any disclaimer, the term of this patent is extended or adjusted under 35 U.S.C. 154(b) by 46 days.

(21) Appl. No.: 16/698,644

(22) Filed: Nov. 27, 2019

(65) Prior Publication Data

US 2021/0157504 A1 May 27, 2021

(51) Int. Cl.
*G06F 3/06* (2006.01)

(52) U.S. Cl.
CPC .......... *G06F 3/0649* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 2005/0182910 A1* | 8/2005 | Stager | ................ | G06F 11/1471 711/162 |
| 2007/0266056 A1* | 11/2007 | Stacey | ................ | G06F 16/185 707/999.203 |
| 2013/0054530 A1* | 2/2013 | Baker | ................ | G06F 16/119 707/639 |

OTHER PUBLICATIONS

"Defining a backup strategy", (c) 2015 NetApp, Inc., p. 1-3.*

* cited by examiner

*Primary Examiner* — Brian R Peugh
(74) *Attorney, Agent, or Firm* — Quinn IP Law (57) ABSTRACT

Snapshot lifecycle management systems and methods are disclosed herein. An example method includes establishing a repository for a user, determining indices for the user, generating a snapshot lifecycle policy for the indices of the cluster. The snapshot lifecycle policy comprises snapshot gathering parameters that dictate when and how often snapshots of indices of the cluster are obtained, as well as retention parameters that control how long the snapshots are stored and when the snapshots are to be deleted. The method includes storing the snapshots for the indices of the cluster in the repository according to the snapshot gathering parameters, and managing retention of the snapshots stored in the repository according to the retention parameters.

20 Claims, 4 Drawing Sheets

SNAPSHOT LIFECYCLE MANAGEMENT SYSTEMS AND METHODS

CROSS REFERENCE TO RELATED APPLICATIONS

N/A.

FIELD OF THE INVENTION

The present technology pertains to snapshot lifecycle management systems and methods, and in some embodiments, the snapshots are created from indices. A user can customize gathering and retention parameters of a snapshot lifecycle policy.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for managing a snapshot lifecycle, the method comprising: establishing a repository for a user; determining indices for the user; applying a snapshot lifecycle policy for the indices of the cluster, wherein the snapshot lifecycle policy comprises snapshot gathering parameters that dictate when and how often snapshots of indices of the cluster are obtained, as well as retention parameters that control how long the snapshots are stored and when the snapshots are to be deleted; storing the snapshots for the indices of the cluster in the repository according to the snapshot gathering parameters; and managing retention of the snapshots stored in the repository according to the retention parameters.

According to some embodiments, the present disclosure is directed to an example system comprising snapshot lifecycle management system, the system comprising: a processor; and a memory for storing instructions, the processor executing the instructions to: establish a repository for a user; determine creation indices of a cluster; generate a snapshot lifecycle policy for the indices of the cluster, wherein the snapshot lifecycle policy comprises snapshot gathering parameters that dictate when and how often snapshots of indices of the cluster are obtained, as well as retention parameters that control how long the snapshots are stored and when the snapshots are to be deleted; store the snapshots for the indices of the cluster in the repository according to the snapshot gathering parameters; and manage retention of the snapshots stored in the repository according to the retention parameters.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, the present disclosure is directed to systems and methods for snapshot lifecycle management. In general, the systems and methods herein allow for creation and management of snapshots of indices related to search services. In some embodiments, snapshot lifecycle management includes the creation of snapshot lifecycle policies. These snapshot lifecycle policies can include snapshot gathering parameters and may optionally comprise snapshot retention parameters. An administrator can define policies that manage when and how often snapshots are obtained to ensure that appropriate, recent backups are ready if disaster strikes or the data needs to be restored for other reasons.

In some embodiments, the snapshot lifecycle policies define or inform how snapshots are retained, including how and when snapshots are deleted. In various instances, snapshot deletion can be scheduled in cycles to limit or otherwise regulate snapshot deletion processes.

According to some embodiments, the systems and methods herein can pre-analyze index data that are to be included in a snapshot and append identifying metadata to a snapshot. This metadata can be used to filter snapshots during retrieval and/or deletion processes. In general, identifying metadata relates to the content (e.g., index) within the snapshot.

Figure 1:
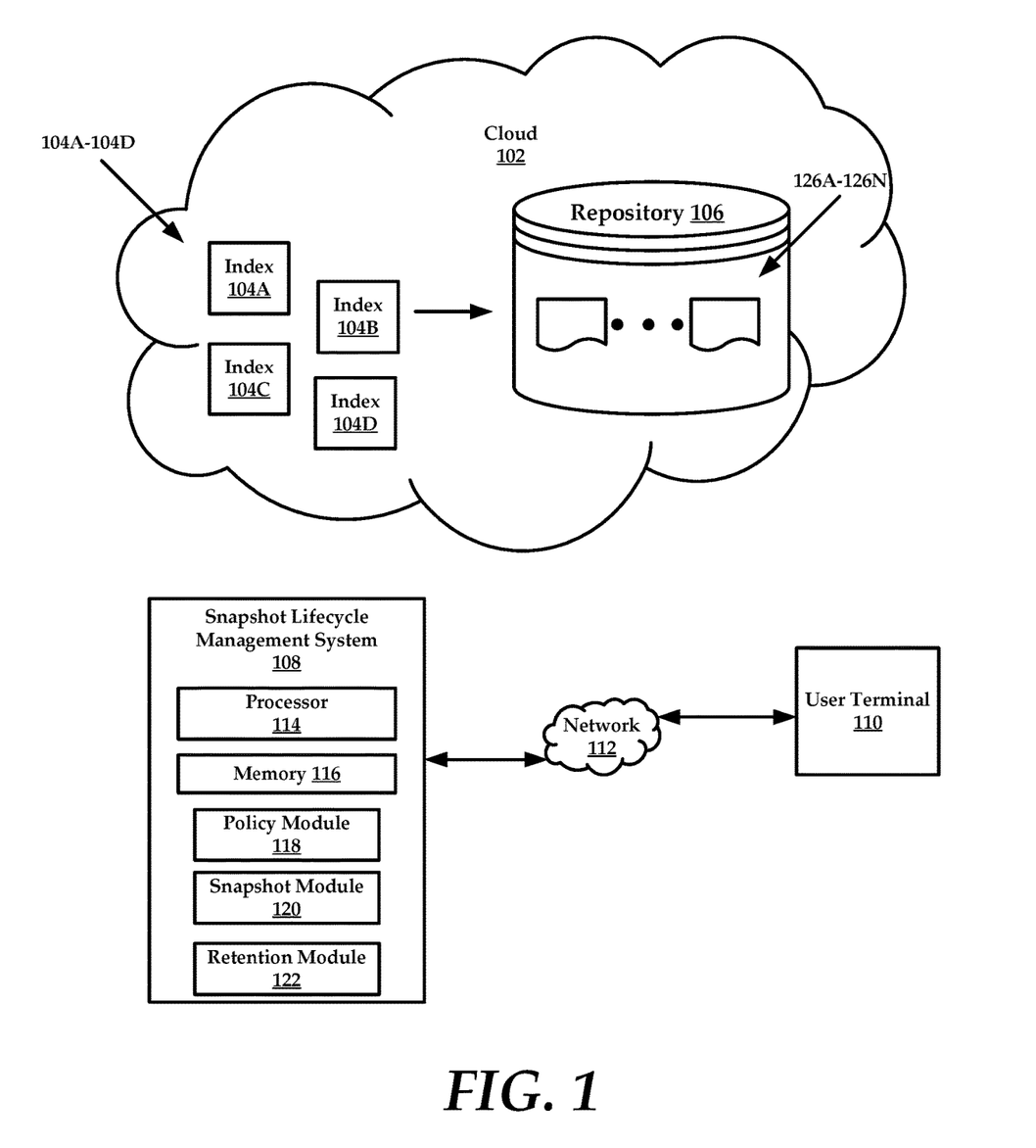
FIG. 1 is a schematic diagram of an example environment where aspects of the present disclosure can be practiced.

FIG. 1 is a schematic view of an example environment for practicing aspects of the present disclosure. The environment can include a cloud 102, one or more indices 104A-104D (index 104A, index 104B, index 104C, and index 104D . . . index 104N), a repository 106, a snapshot lifecycle management system 108, a user terminal 110, and a network 112. The network 112 can include any public or private network. While the embodiments described herein include a cloud environment, such as the cloud 102, the present disclosure can be implemented in any suitable computing environment. For example, snapshot lifecycle management could be implemented in a distributed server configuration.

The indices disclosed herein can be distributed across nodes and/or clusters of nodes used for search services. For example, systems like Elasticsearch™ involve multiple processes which all run independently, typically distributed across separate computers, but which communicate with each other over a network to cooperate and act as a single system. Each process is known as a node. In some instances, parts of a search index can be distributed across a plurality of nodes. Distributed systems like this are useful because they have access to the sum of the computing power of all the individual host computers. For purposes of brevity and clarity, the snapshot management processes disclosed herein are disclosed relative to indices, such as the one or more indices 104A-104D. To be sure, fewer or more indices can be implemented in some embodiments.

Broadly, the snapshot lifecycle management system 108 can implement a snapshot lifecycle policy which is used to automatically back up Elasticsearch™ indices using snapshots according to a schedule. The snapshots can be obtained according to snapshot gathering parameters which identify days and/or times when snapshots are obtained. Once these snapshots have been created, they are retained in the repository 106 for a configured amount of time and then deleted per pre-configured retention parameters defined in the snapshot lifecycle policy.

In some embodiments, the snapshot lifecycle management system 108 can be implemented and reside within the cloud 102. The snapshot lifecycle management system 108 could alternatively operate outside the cloud 102. In some embodiments, the snapshot lifecycle management system 108 comprises a processor 114 and memory 116. The processor 114 executes instructions stored in the memory 116 to perform methods and processes related to snapshot lifecycle management. While the snapshot lifecycle management system 108 has been described in an example embodiment as a system, one of ordinary skill in the art will appreciate that this system can be embodied as software or application(s) executing within a cloud or a server.

The snapshot lifecycle management system 108 can comprise a policy module 118, a snapshot module 120, and a retention module 122. Generally, the policy module 118 allows a user to create or customize snapshot lifecycle policy parameters, such as snapshot creation and/or retention parameters. The snapshot module 120 is configured to obtain snapshots of the indices according to the snapshot lifecycle policy, as well as store the snapshots in the repository 106. The retention module 122 can delete snapshots in accordance with retention parameters established in the snapshot lifecycle policy managed by the policy module 118. The retention module 122 can also retrieve snapshots in response to a request from a user.

In some embodiments, when a user has administration privileges, the user is allowed to obtain and delete snapshots even for indices for which the role/user may not have access. Alternatively, a user can have a read-only role that allows the user to retrieve policies (but not update, execute, or delete them), as well as only view the history index.

When a user has created their repository 106, the snapshot lifecycle management system 108 can establish a default snapshot lifecycle policy. A default snapshot lifecycle policy can define that snapshots are obtained for the one or more indices 104A-104D every day at a specified time. For example, snapshots 126A-126N are obtained and stored in the repository 106 every day at a particular time.

Snapshot lifecycle management policies can be written in JSON and can define when to take snapshots, what the snapshots should be named, and which indices should be included, among other things. In some embodiments, a snapshot lifecycle policy can include a schedule that defines a periodic or absolute schedule at which the snapshots are created and expired snapshots are deleted.

An example snapshot lifecycle policy can include information that is indicative of when the snapshot is to be taken, for example at 1:30 AM each day. The example snapshot lifecycle policy can include information that is indicative of a name each snapshot should be given, using date math to include the current date in the name of the snapshot. The example snapshot lifecycle policy can include information that is indicative of the repository 106 the snapshot should be stored in, as well as the configuration to be used for the snapshot requests. The example snapshot lifecycle policy can include information that is indicative of which indices should be included in the snapshot. The example snapshot lifecycle policy can include information that is indicative of retention configuration, such as how long snapshots should be retained. For example, a snapshot can be kept for 30 days. The example snapshot lifecycle policy can include information that is indicative of a threshold minimum number of successful snapshots that should be retained, regardless of the retention policy. For example, at least five successful snapshots are maintained. Maximum numbers of snapshots can also be defined. For example, it can be specified that no more than 50 successful snapshots should be kept, even if they are less than 30 days old.

In various embodiments, a unique name can be assigned to each snapshot created under the snapshot lifecycle policy. To prevent conflicting snapshot names, a UUID (unique user identity) is automatically appended to each snapshot name. In some embodiments, the name parameter of the snapshot lifecycle policy supports the date math allowed in index names. Date math snapshot name resolution enables a user to dynamically name snapshots based on when the snapshot is taken. This allows embedding date information into the name of the snapshot so they can easily be filtered by a user at a later time. In some embodiments this data math can be appended to a snapshot. The date math metadata can be used to filter stored snapshots for retrieval and/or deletion, as will be discussed in greater detail herein.

In some embodiments, multiple snapshot lifecycle management policies can be used for various indices. For example, snapshots can be obtained for indices 104A and 104B according to a first snapshot lifecycle policy, while snapshots can be obtained for index 104C and index 104D according to a second snapshot lifecycle policy. In the first snapshot lifecycle policy, snapshots can be obtained every hour and these snapshots are retained for two months before being scheduled for deletion. In the snapshot lifecycle policy, snapshots can be obtained every day and these snapshots are retained for six months before being scheduled for deletion.

Schedule changes to existing policies can be applied immediately. When the snapshots 126A-126N have been created, the snapshots 126A-126N are kept for a configured amount of time and then deleted per configured retention parameters of the snapshot lifecycle policy. In various embodiments, the user can determine or select indices which are snapshotted.

A snapshot can include a complete copy of an index, or in some instances only a selected portion of the index. That is, snapshots can be obtained incrementally. This means that when the snapshot lifecycle management system 108 creates a snapshot of an index, the snapshot lifecycle management system 108 avoids copying data that is already stored in the repository 106 as part of an earlier snapshot of the same index. Therefore it can be efficient to take snapshots of a cluster of nodes or indices frequently.

Repositories can, over time, accumulate data that is not referenced by any existing snapshot. This is a result of the data safety guarantees the snapshot functionality provides in failure scenarios during snapshot creation and the decentralized nature of the snapshot creation process. This unreferenced data does in no way negatively impact the performance or safety of a snapshot repository but leads to higher than necessary storage use. In order to clean up this unreferenced data, users can call the cleanup endpoint for a repository which will trigger a complete accounting of the repositories' contents and subsequent deletion of all unreferenced data that was found. In some embodiments, cleanup processes can be automatically triggered by the snapshot lifecycle management system 108.

When a snapshot is deleted from a repository, the snapshot lifecycle management system 108 deletes files that are associated with the deleted snapshot and not used by any other snapshots. If the deleted snapshot operation is executed while the snapshot is being created the snapshotting process can be aborted and all files created as part of the snapshotting process will be cleaned. Therefore, the delete snapshot operation can be used to cancel long running snapshot operations that were started by mistake. Methods for scheduling snapshot deletion are disclosed in greater detail herein.

In some embodiments, the user can query the snapshot lifecycle management system 108 to provide a list of indices that should be included into the snapshot. The list can be specified using an indices parameter that supports multi-index syntax. The snapshot request also supports an unavailable/ignore option that causes indices that do not exist to be ignored during snapshot creation. For example, if index 104B were to be unavailable or was deleted, a snapshot backup for all indices would ignore that index 104B was missing and would still create a snapshot for index 104A, index 104C, and index 104D.

By default, when this option is not set and an index is missing the snapshot request will fail. By setting this option to false it is possible to prevent the cluster global state to be stored as part of the snapshot. By default, the entire snapshot will fail if one or more indices participating in the snapshot don't have all data available. This behavior can be changed by setting partial to true.

As noted above, a metadata field of a snapshot can be used to attach arbitrary metadata to the snapshot. This may be a record of who obtained the snapshot, why it was taken, or any other data that might be useful. Snapshot names can be automatically derived using date math expressions, similarly as when creating new indices. Note that special characters can be URI (uniform resource indicator) encoded. Additional uses for metadata, including for snapshot retrieval and/or deletion are disclosed infra.

As noted above, the index snapshot process is incremental. In the process of making the index snapshot the snapshot lifecycle management system 108 analyzes the list of the index files that are already stored in the repository 106 and copies only files that were created or changed since the last snapshot. That allows multiple snapshots to be preserved in the repository in a compact form. Snapshotting process is executed in non-blocking fashion. All indexing and searching operation can continue to be executed against the index that is being snapshotted. However, a snapshot represents the point-in-time view of the index at the moment when snapshot was created, so no records that were added to the index after the snapshot process was started will be present in the snapshot. The snapshot process starts immediately for the primary shards that has been started and are not relocating at the moment. In some embodiments, relocations of snapshotting shards may be prevented during snapshot creation. In other embodiments, the snapshot lifecycle management system 108 waits for relocation or initialization of shards to complete before snapshotting them.

Besides creating a copy of each index, the snapshot lifecycle management system 108 can also store global cluster metadata, which includes persistent cluster (e.g., group of nodes) settings and templates. The transient settings and registered snapshot repositories are not stored as part of the snapshot.

In some instances, only one snapshot process can be executed in the cluster at any time. While snapshot of a particular index or portion of an index is being created these data cannot be moved to another node, which may interfere with rebalancing process and allocation filtering. The snapshot lifecycle management system 108 may move an index or portion of an index to another node (according to the current allocation filtering settings and rebalancing algorithm) once the snapshot is finished.

Once one or more snapshots have been stored in the repository 106 as stored snapshots, the snapshot lifecycle management system 108 can implement the retention parameters of the snapshot lifecycle policy. As an example, the retention parameters in the policy configured could be conceptually described as follows: remove snapshots older than thirty days, but always keep the latest five snapshots. If there are more than fifty snapshots, remove the oldest surplus snapshots until there are no more than fifty successful snapshots.

If multiple policies are configured to snapshot to the same repository, or manual snapshots have been taken, these snapshots are treated as not eligible for retention, and do not count towards any limits. This allows multiple policies to have differing retention configuration while using the same snapshot repository.

In various embodiments, the snapshot lifecycle management system 108 can maintain retention metrics such as the number of times retention has been run, the number of times retention failed while running, the number of times retention has met a time limit and had to stop before deleting all eligible snapshots, total time spent deleting snapshots by the retention process, a number of snapshots created by the "daily-snapshots" policy that have been deleted, a number of snapshots that failed to be deleted, a total number of snapshots deleted across all policies, and a total number of snapshot deletion failures across all policies.

According to some embodiments, the snapshot lifecycle management system 108 can be configured to implement specific retention parameters related to how stored snapshots are deleted. Broadly, retention parameters include an indication of a time period after which a snapshot is considered expired and eligible for deletion, as noted above. The retention parameters also include an indication of the maximum number of snapshots to retain, even if the snapshots have not yet expired. The retention parameters can further include an indication of the minimum number of snapshots to retain, even if the snapshots have expired.

In various embodiments, the snapshot lifecycle management system 108 can be configured to establish a deletion schedule that comprises deletion cycles that have a deletion timeframe. Stored snapshots can be deleted during a first deletion cycle but there are remaining stored snapshots. The remaining stored snapshots are deleted in one or more subsequent deletion cycles. For example, if there are ten stored snapshots that have been marked for deletion, the deletion cycle can be configured to run every day or once a week. Each deletion cycle comprises a deletion timeframe, such as an hour. In use, if three of the ten stored snapshots have been deleted over an hour period, but deleting a fourth would cause the deletion process to run more than an hour, the snapshot lifecycle management system 108 can delay deletion of the fourth or more of the stored snapshots until the next deletion cycle. In instances where snapshotting operations cannot be performed while a deletion is ongoing, the snapshot lifecycle management system 108 can delay certain deletion operations. For example, if a single snapshot deletion took two hours, during those two hours no other snapshots could be taken. Thus, if there is a need to obtain a snapshot, this can be prioritized even when additional snapshots are awaiting deletion. The additional snapshots (or at least some of these snapshots) can be deleted in a subsequent deletion cycle.

Figure 2:
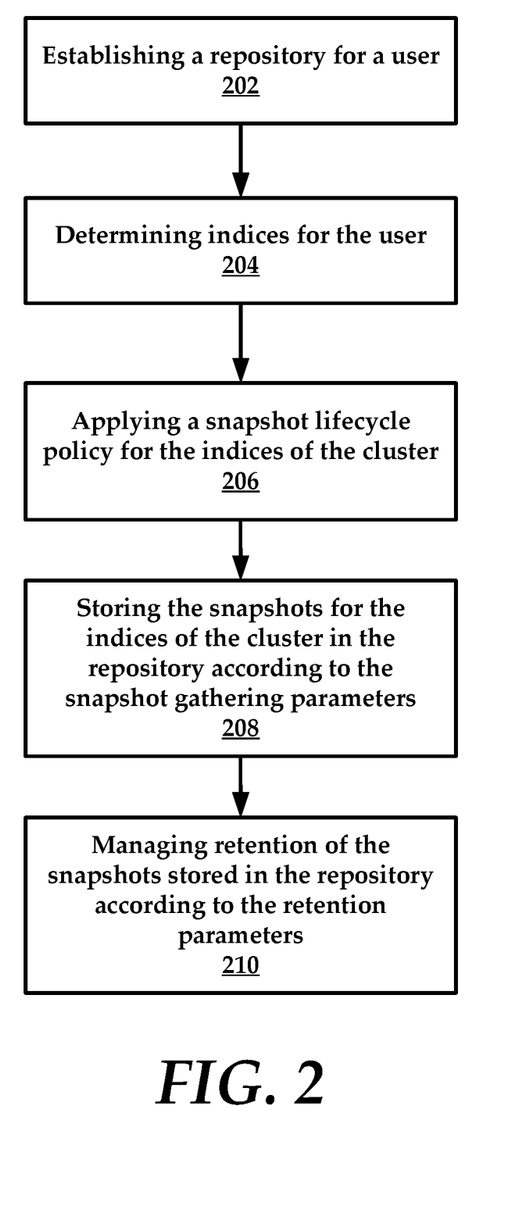
FIG. 2 is an example flowchart of a method of the present disclosure related to snapshot lifecycle management.

FIG. 2 is a flowchart of an example method for managing a snapshot lifecycle of the present disclosure. The method includes a step 202 of establishing a repository for a user. The repository is a dedicated space for storage of snapshots of indices of the user. Next, the method includes a step 204 of determining indices for the user. These are the indices for which snapshots are to be created. It will be understood that in some embodiments steps 202 and 204 are optional. That is, in some implementations the method can be considered to initiate with step 206 as described below, with steps 202 and 204 being previously completed by a user.

In some instances, the method includes a step 206 of applying a snapshot lifecycle policy for the indices of the cluster. The snapshot lifecycle policy comprises snapshot gathering parameters that dictate when and how often snapshots of indices of the cluster are obtained, as well as retention parameters that control how long the snapshots are stored and when the snapshots are to be deleted. In some embodiments, the snapshot lifecycle policy includes default parameters that can subsequently be customized by a user. In some embodiments, snapshot gathering parameters define a schedule that identifies when new snapshots are to be created and when expired snapshots are to be deleted. Part of the policy can include assigning a name to each of the snapshots and establishing configurations for each of the snapshots that includes any of an array of index names or wildcard pattern of index names included in snapshots and cluster states.

In some embodiments, snapshots are obtained according to the policy. The method can include applying an ignore index parameter that allows a snapshot to be obtained even when an index of the indices is missing.

Once the snapshot lifecycle policy is established, the method includes a step 208 of storing the snapshots for the indices of the cluster in the repository according to the snapshot gathering parameters, as well as a step 210 of managing retention of the snapshots stored in the repository according to the retention parameters. This can include managing when stored snapshots are deleted. In various instances, the retention parameters include an indication of a time period after which a snapshot is considered expired and eligible for deletion, an indication of the maximum number of snapshots to retain, even if the snapshots have not yet expired, and an indication of a minimum number of the snapshots to retain, even if the snapshots have expired. When a number of the snapshots in the repository exceed the maximum number, the most recent snapshots are retained and older snapshots can be deleted.

Figure 3:
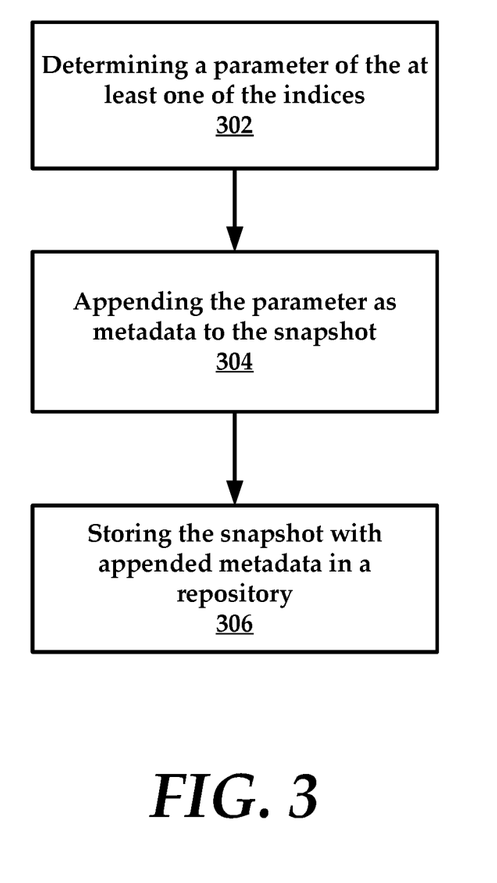
FIG. 3 is a flowchart of an example method of the present disclosure related to storing and filtering.

FIG. 3 is a method for storing and/or filtering snapshots of an index. The method generally allows for pre-analysis of the content within the snapshots and appending of data to the snapshot. Thus, the data appended to the snapshot is indicative of a parameter or metric of the index data within the snapshot. The method includes a step 302 of determining a parameter of the at least one of the indices. An example parameter could include an owner name or a time stamp when an index was created or last updated. The method can include a step 304 of appending the parameter as metadata to the snapshot. For example, the snapshot is appended with metadata that indicates an age of an index within the snapshot. The method can include a step 306 of storing the snapshot with appended metadata in a repository.

Figure 4:
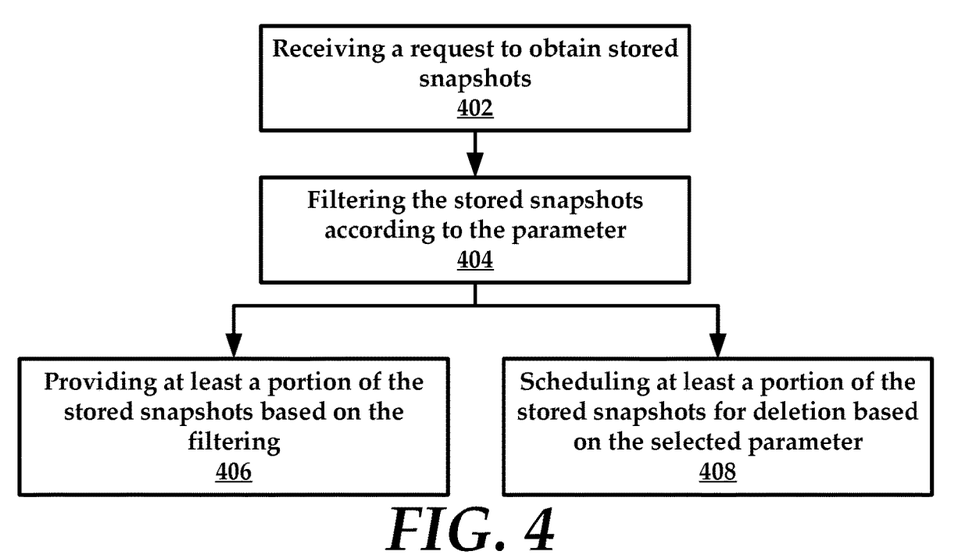
FIG. 4 is a flowchart of another example method of the present disclosure related to the use of snapshots with metadata.

FIG. 4 is a flowchart of a method related to the use of snapshots with metadata. The method includes a step 402 of receiving a request to obtain stored snapshots. The request includes an indication of a parameter that can be used to filter which stored snapshots are to be obtained from the repository. The request could indicate that the user only desires snapshots that have index data that is newer than five days. The method includes a step 404 of filtering the stored snapshots according to the parameter. For example, only stored snapshots having index data that is newer than five days old will be returned. The method includes a step 406 of providing at least a portion of the stored snapshots based on the filtering. The method could alternatively include a step 408 of scheduling at least a portion of the stored snapshots for deletion based on the selected parameter.

Figure 5:
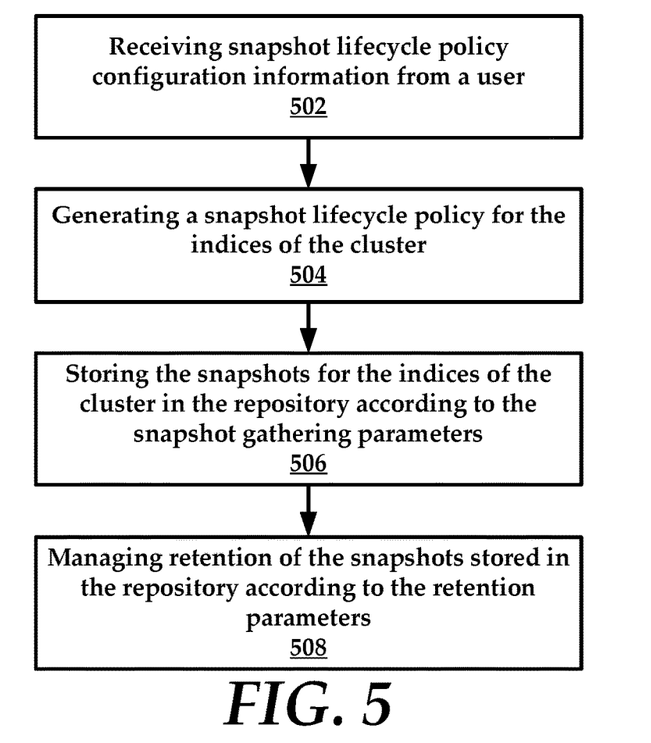
FIG. 5 is a flowchart of a yet another example method of the present disclosure related to snapshot lifecycle management.

FIG. 5 is a flowchart of another example method. The method includes a step 502 of receiving snapshot lifecycle policy configuration information from a user. The method can further include a step 504 of generating a snapshot lifecycle policy for the indices of the cluster. The snapshot lifecycle policy comprises snapshot gathering parameters that dictate when and how often snapshots of indices of the cluster are obtained, as well as retention parameters that control how long the snapshots are stored and when the snapshots are to be deleted. In various instances, the method includes a step 506 of storing the snapshots for the indices of the cluster in the repository according to the snapshot gathering parameters, as well as a step 508 of managing retention of the snapshots stored in the repository according to the retention parameters.

Figure 6:
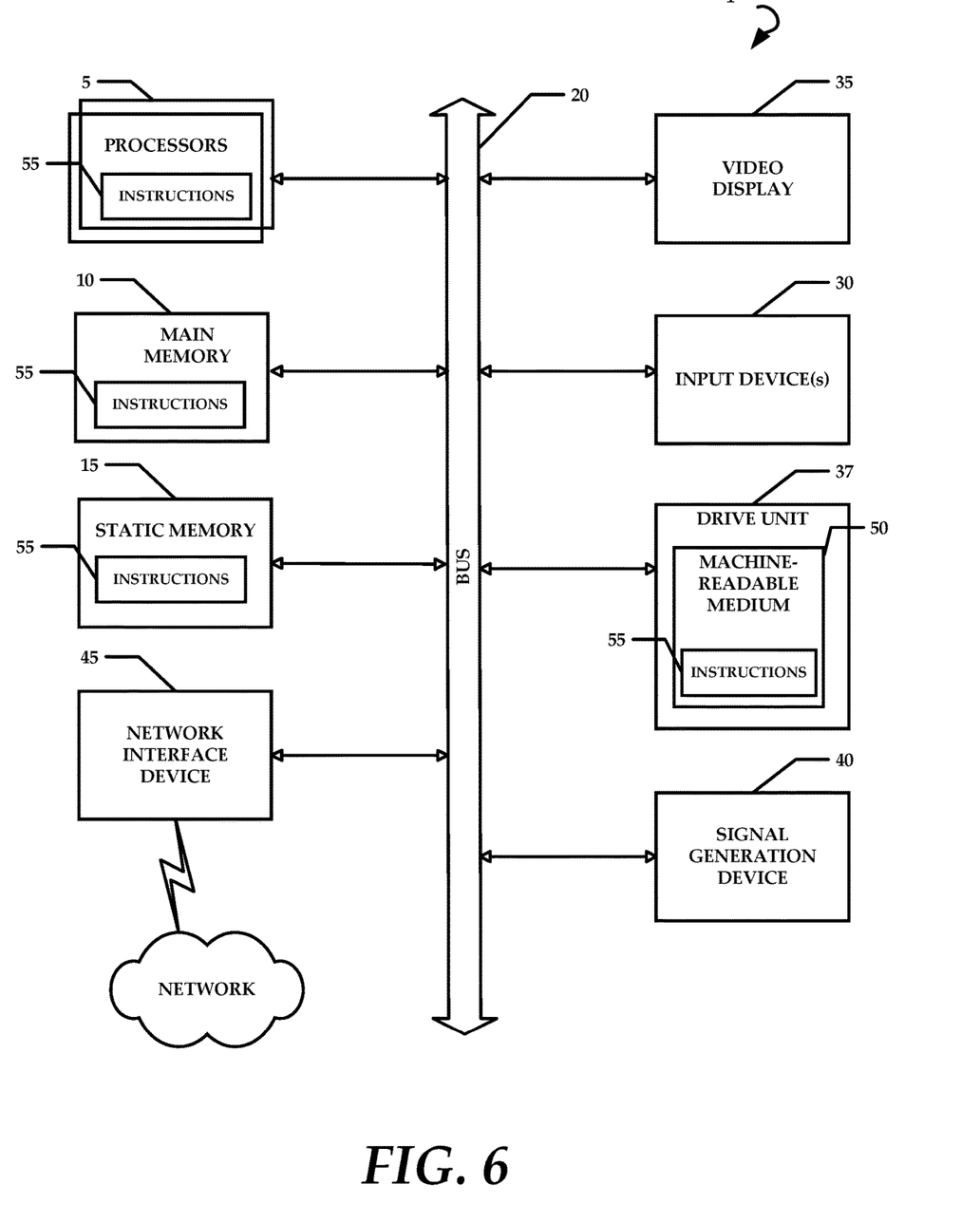
FIG. 6 is a schematic diagram of an example computer system that can be used to practice aspects of the present disclosure.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for managing a snapshot lifecycle, the method comprising:
    applying a snapshot lifecycle policy for indices of a cluster, wherein the snapshot lifecycle policy comprises snapshot gathering parameters that dictate when and how often snapshots of indices of the cluster are obtained, as well as retention parameters that control how long the snapshots are stored and when the snapshots are to be deleted, the snapshot lifecycle policy further comprises a minimum number and a maximum number of the snapshots to be retained independent of how long snapshots are stored, wherein the cluster is comprised of a plurality of nodes and where each node includes an index;
    storing the snapshots for the indices of the cluster in a repository according to the snapshot gathering parameters, wherein each snapshot of the snapshots is comprised of at least one index from the plurality of nodes and at least one of the snapshots comprises only selected portions of indices across at least two of the plurality of nodes to avoid copying data already stored as part of an earlier snapshot of an index corresponding to one of the selected portions of indices; and
    managing retention of the snapshots stored in the repository according to the retention parameters, the managing including an accounting of a complete contents of the repository and deletion of an unreferenced index, the unreferenced index comprising data stored in the repository that is not referenced by at least one of the snapshots.

2. The method according to claim 1, wherein the snapshot gathering parameters comprises a schedule that identifies when new snapshots are to be created and when expired snapshots are to be deleted.

3. The method according to claim 1, further comprising assigning a unique name to each of the snapshots, and wherein the snapshots includes identifying metadata.

4. The method according to claim 1, further comprising establishing configurations for each of the snapshots that includes any of an array of index names or wildcard pattern of index names included in snapshots and cluster states.

5. The method according to claim 1, further comprising applying an ignore index parameter that allows a snapshot to be obtained even when an index of the indices is missing.

6. The method according to claim 1, wherein the retention parameters include an indication of a time period after which a snapshot is considered expired and eligible for deletion, an indication of a maximum number of the snapshots to retain, even if the snapshots have not yet expired, and an indication of a minimum number of the snapshots to retain, even if the snapshots have expired, wherein when a number of the snapshots in the repository exceed the maximum number, the most recent snapshots are retained and older snapshots are deleted.

7. The method according to claim 1, further comprising:
    establishing a repository for a user; and
    determining the indices for the user.

8. The method according to claim 1, further comprising:
    determining a parameter of the at least one of the indices; and
    appending the parameter as metadata to the snapshot.

9. The method according to claim 8, further comprising:
    receiving a request to obtain stored snapshots;
    filtering the stored snapshots according to the parameter; and
    providing at least a portion of the stored snapshots based on the filtering.

10. The method according to claim 9, further comprising establishing a deletion schedule that comprises deletion cycles that have a deletion timeframe, wherein when stored snapshots are deleted during a first deletion cycle but there are remaining stored snapshots, the remaining stored snapshots are deleted in one or more subsequent deletion cycles.

11. A snapshot lifecycle management system, the system comprising:
    a processor; and
    a memory for storing instructions, the processor executing the instructions to:
    establish a repository for a user;
    determine creation indices of a cluster;
    generate a snapshot lifecycle policy for the indices of the cluster, wherein the snapshot lifecycle policy comprises snapshot gathering parameters that dictate when and how often snapshots of indices of the cluster are obtained, as well as retention parameters that control how long the snapshots are stored and when the snapshots are to be deleted, the snapshot lifecycle policy further comprises a minimum number and a maximum number of the snapshots to be retained independent of how long snapshots are stored, wherein the cluster is comprised of a plurality of nodes and where each node includes an index;

store the snapshots for the indices of the cluster in the repository according to the snapshot gathering parameters, wherein each snapshot of the snapshots is comprised of at least one index from the plurality of nodes and at least one of the snapshots comprises only selected portions of indices across at least two of the plurality of nodes to avoid copying data already stored as part of an earlier snapshot of an index corresponding to one of the selected portions of indices; and manage retention of the snapshots stored in the repository according to the retention parameters, the managed retention including an accounting of a complete contents of the repository and deletion of an unreferenced index, the unreferenced index comprising data that is not referenced by at least one of the snapshots.

12. The system according to claim 11, wherein the snapshot gathering parameters comprises a schedule that identifies when new snapshots are to be created and when expired snapshots are to be deleted.

13. The system according to claim 11, wherein the processor executes the instructions to assign a name to each of the snapshots, and wherein the snapshots includes identifying metadata.

14. The system according to claim 11, wherein the processor executes the instructions to establish configurations for each of the snapshots that includes any of an array of index names or wildcard pattern of index names included in snapshots and cluster states.

15. The system according to claim 11, wherein the processor executes the instructions to apply an ignore index parameter that allows a snapshot to be obtained even when an index of the indices is missing.

16. The system according to claim 11, wherein the retention parameters include an indication of a time period after which a snapshot is considered expired and eligible for deletion, an indication of a maximum number of the snapshots to retain, even if the snapshots have not yet expired, and an indication of a minimum number of the snapshots to retain, even if the snapshots have expired.

17. The system according to claim 16, wherein when a number of the snapshots in the repository exceed the maximum number, the most recent snapshots are retained and older snapshots are deleted.

18. The system according to claim 11, wherein the processor executes the instructions to:

determine a parameter of the at least one of the indices;

append the parameter as metadata to the snapshot;

receive a request to obtain stored snapshots;

filter the stored snapshots according to the parameter; and provide at least a portion of the stored snapshots based on the filter.

19. The system according to claim 18, wherein the processor executes the instructions to establish a deletion schedule that comprises deletion cycles that have a deletion timeframe.

20. The system according to claim 19, wherein when stored snapshots are deleted during a first deletion cycle but there are remaining stored snapshots, the remaining stored snapshots are deleted in one or more subsequent deletion cycles.

* * * * *